United States Patent
Piduri

(10) Patent No.: US 10,296,242 B2
(45) Date of Patent: May 21, 2019

(54) SUPPORTING REPLICATION AND RECOVERY OF VIRTUAL VOLUMES

(71) Applicant: VMware, Inc., Palo Alto, CA (US)

(72) Inventor: Sudarsana R Piduri, Campbell, CA (US)

(73) Assignee: VMWARE, INC., Palo Alto, CA (US)

( * ) Notice: Subject to any disclaimer, the term of this patent is extended or adjusted under 35 U.S.C. 154(b) by 408 days.

(21) Appl. No.: 15/189,298

(22) Filed: Jun. 22, 2016

(65) Prior Publication Data

US 2017/0371567 A1    Dec. 28, 2017

(51) Int. Cl.
*G06F 3/06* (2006.01)

(52) U.S. Cl.
CPC .......... *G06F 3/0619* (2013.01); *G06F 3/065* (2013.01); *G06F 3/0665* (2013.01); *G06F 3/0689* (2013.01)

(58) Field of Classification Search
CPC ...... G06F 3/0619; G06F 3/065; G06F 3/0665; G06F 3/0689
See application file for complete search history.

(56) References Cited

U.S. PATENT DOCUMENTS

| | | | |
|---|---|---|---|
| 2010/0185583 A1* | 7/2010 | Berinde | G06F 11/1461 711/E12.001 |
| 2016/0179437 A1* | 6/2016 | Piduri | G06F 3/067 707/634 |

\* cited by examiner

*Primary Examiner* — Aracelis Ruiz

(57) ABSTRACT

Techniques for supporting replication and recovery of virtual volumes are provided. In various embodiments, these techniques can include workflows and application programming interfaces (APIs) that facilitate: (1) the provisioning of virtual volumes with metadata indicating that the virtual volumes should be replicated from one virtual volume-enabled storage array/site to another; (2) the discovery of a replication topology across virtual volume-enabled storage arrays/sites; (3) the orchestration of a test failover of a set of virtual volumes; and (4) the orchestration of an actual failover of a set of virtual volumes.

21 Claims, 6 Drawing Sheets

SUPPORTING REPLICATION AND RECOVERY OF VIRTUAL VOLUMES

BACKGROUND

Conventional storage arrays store persistent data in coarse storage containers such as LUNs or file system volumes. This means that if a conventional storage array needs to apply service policies or management operations to its stored data, the array can only do so on a per-LUN/file system volume basis because the LUN/file system volume is the smallest logical unit of storage that is understood by the array. This limitation can be problematic in virtualized deployments where there is typically a many-to-one mapping between storage clients, such as a virtual machines (VMs), and LUNs/file system volumes. In these deployments, each VM may require a certain quality of service (QoS) and/or storage management operations that are specific to its data. However, since the data for multiple VMs are contained in one LUN/file system volume, the storage array cannot distinguish one VM from another and thus cannot autonomously apply storage policies/operations on a per-VM basis.

To address the foregoing, a framework has been developed (referred to herein as the "VVol" framework) that enables storage arrays to understand and manage data in the form of more granular logical storage objects known as virtual volumes. Unlike LUNs and file system volumes, each virtual volume is configured to hold the persistent data (e.g., virtual disk data, VM configuration data, etc.) for a particular VM. With this framework, the platform components in a virtualized deployment can inform a VVol-enabled storage array of service policies or management operations that are needed with respect to specific virtual volumes (and thus, specific VMs). The VVol-enabled storage array can then autonomously apply the policies or operations to the specified virtual volumes. Additional information regarding the VVol framework can be found in commonly-owned U.S. Pat. No. 8,775,774, issued Jul. 8, 2014, entitled "Management System and Methods for Object Storage System."

Existing implementations of the VVol framework support certain VM storage management operations such as snapshotting and cloning. However, these existing implementations generally do not support the replication of a VM and its constituent virtual volumes from a first storage array/site to one or more second storage arrays/sites, or the recovery of such replicated virtual volumes at the second storage arrays/sites. Accordingly, it would be desirable to have techniques that address these particular use cases.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Embodiments of the present disclosure provide enhancements to the VVol framework that support replication and recovery of virtual volumes. In particular, these enhancements include new workflows and application programming interfaces (APIs) that facilitate: (1) the provisioning of virtual volumes with metadata indicating that the virtual volumes should be replicated from one VVol-enabled storage array/site to one or more other VVol-enabled storage arrays/sites; (2) the discovery of a replication topology across VVol-enabled storage arrays/sites; (3) the orchestration of a test failover of a related set of virtual volumes (referred to herein as a "replication group"); and (4) the orchestration of an actual failover of a replication group. These and other aspects of the present disclosure are described in further detail in the sections that follow.

1. System Environment

Figure 1:
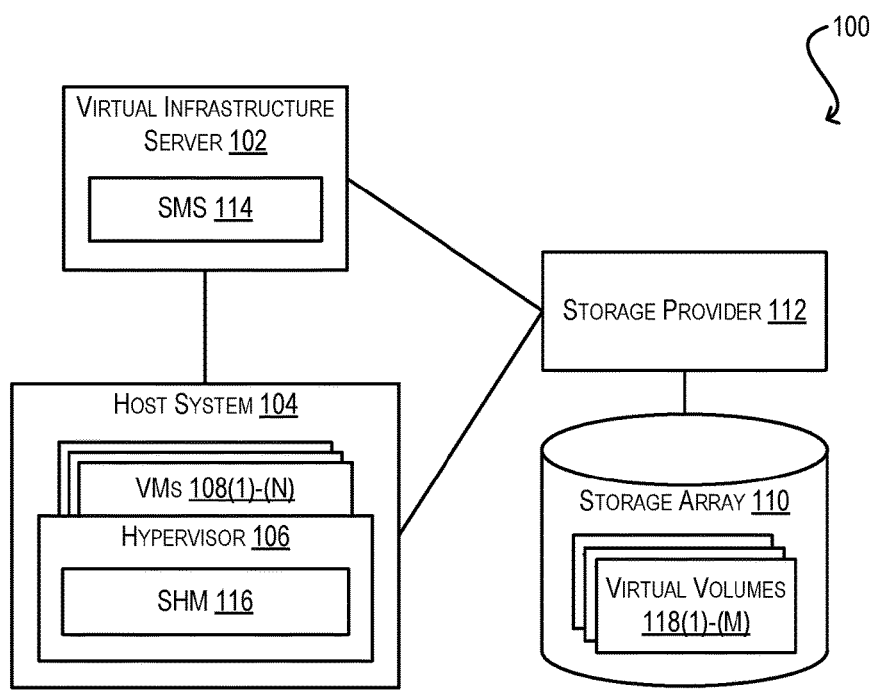
FIG. 1 depicts a system environment that supports the VVol framework according to an embodiment.

FIG. 1 depicts a virtualized system environment 100 that implements the VVol framework according to an embodiment. As shown, system environment 100 includes a virtual infrastructure (VI) server 102 that is configured to manage a host system 104 executing a hypervisor 106 and a number of VMs 108(1)-(N). In one embodiment, VI server 102 can correspond to an instance of the vCenter server developed by VMware Inc. and hypervisor 106 can correspond to an instance of VMware's ESXi hypervisor. Although only a single host system is shown in FIG. 1, it should be appreciated that VI server 102 may simultaneously manage a plurality of host systems (each comprising multiple VMs), such as all of the host systems in a virtual infrastructure cluster.

System environment 100 further includes a storage array 110 and an associated storage provider (SP) 112, which is communicatively coupled with VI server 102 and host system 104. Although SP 112 is shown as being distinct from storage array 110, in some cases SP 112 may be implemented as an integral component of array 110. In various embodiments, SP 112 can interoperate with a storage management service (SMS) 114 running on VI server 102 and a storage host module (SHM) 116 running within hypervisor 106 of host system 104. Collectively, components 112, 114, and 116 (which comprise the VVol framework) can allow the persistent data of VMs 108(1)-(N) to be maintained on storage array 110 in the form of per-VM storage objects known as virtual volumes (i.e., virtual volumes 118(1)-(M)). Stated another way, VVol components 112, 114, and 116 can make storage array 110 aware of the relationships between its stored data and VMs 108(1)-(N) running on host system 104. This, in turn, can enable storage array 110 (which is referred to as a "VVol-enabled" array) to provide differentiated storage services on a per-VM, rather than per-LUN or file system volume, basis.

By way of example, at the time of a provisioning a new VM 108(X) on host system 104, SMS 114 (or SHM 116) can send a request to SP 112 for creating a virtual volume corresponding to, e.g., a virtual disk of VM 108(X) on storage array 110. In response, SP 112 can create the virtual volume on array 110 and return an identifier (ID) of the newly-created virtual volume to the caller, which can be associated with VM 108(X). At a later point in time, SMS 114 or SHM 116 can send further requests to SP 112 using the virtual volume ID in order to apply service policies or storage management operations with respect to the virtual disk of VM 108(X). SP 112 can then process these requests accordingly against the specified virtual volume object stored in storage array 110.

As mentioned in the Background section, existing VVol framework implementations only support certain types of storage management operations on virtual volumes such as snapshotting and cloning, and do not allow a first VVol-enabled storage array at a first site (i.e., source site) to autonomously replicate virtual volumes to a second VVol-enabled storage array at a second site (i.e., target site). These existing implementations also do not allow the second storage array to orchestrate recovery of the replicated virtual volumes at the second site.

Figure 2:
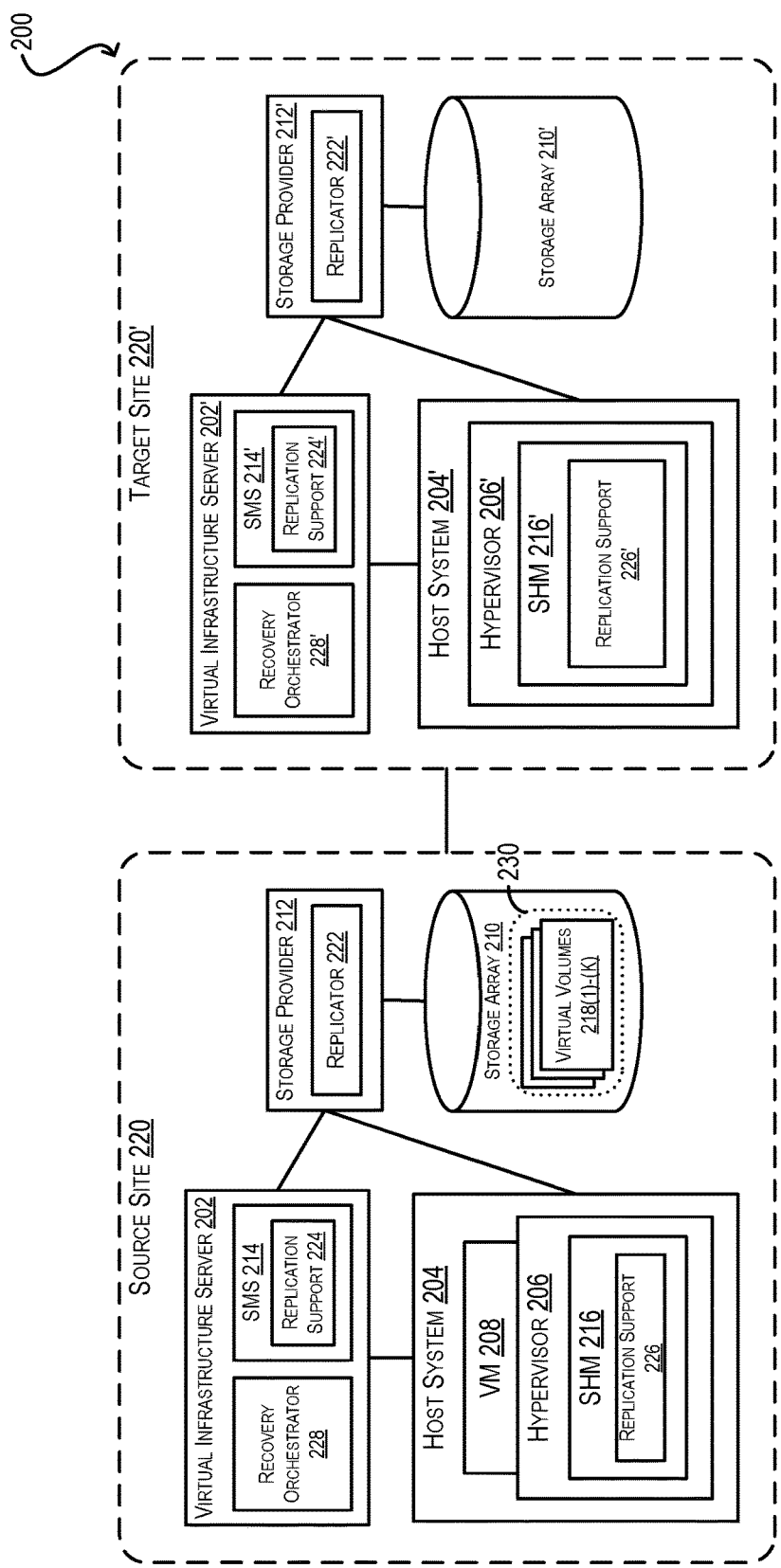
FIG. 2 depicts a system environment that supports replication/recovery-related enhancements to the VVol framework according to an embodiment.

To address this, FIG. 2 depicts a system environment 200 that implements enhancements to the VVol framework that support these particular features. In FIG. 2, two sites—a source site 220 and a target site 220'—are depicted, which correspond to virtualized deployments at two different locations (e.g., two geographically-dispersed data centers). Each site 220 and 220' includes entities that are similar to system environment 100; for example, source site 220 includes a VI server 202, a host system 204 with a hypervisor 206, a storage array 210, and VVol framework components comprising an SP 212, an SMS 214, and an SHM 216. Similarly, target site 220' includes a VI server 202', a host system 204' with a hypervisor 206', a storage array 210', and VVol framework components comprising an SP 212', an SMS 214', and an SHM 216'.

However, unlike the conventional VVol framework implementation shown in FIG. 1, the VVol components at source site 220 and target site 220' of FIG. 2 include new replicator modules 222/222' within SPs 212/212' and new replication support modules 224/224' and 226/226' within SMSs 214/214' and SHMs 216/216' respectively. Further, VI servers 202/202' at sites 220/220' each includes a new VVol-based recovery orchestrator 228/228'. Taken together, these newly added components can enable (1) the provisioning of virtual volumes for a VM at source site 220 (e.g., virtual volumes 218(1)-218(K) for VM 208) with metadata that causes the virtual volumes to be replicated to target site 220' (note that, in FIG. 2, virtual volumes 218(1)-(K) are provisioned as a single replication group 230, which is explained below); (2) the discovery of a replication topology that is defined between SPs 212 and 212' at sites 220 and 220'; (3) the orchestration of a test failover of a set of virtual volumes (e.g., replication group 230) from source site 220 to target site 220'; and (4) the orchestration of an actual failover of a set of virtual volumes (e.g., replication group 230) from source site 220 to target site 220'. The details of these operations are described below.

It should be appreciated that system environments 100 and 200 of FIGS. 1 and 2 are illustrative and not intended to limit embodiments of the present disclosure. For example, although only a single target site 220' is depicted, the techniques of the present disclosure may be used to support replication of virtual volumes from source site 220 to multiple target sites. Further, the various entities show in FIGS. 1 and 2 can be arranged according to different configurations and may include subcomponents and/or functions that are not explicitly described. One of ordinary skill in the art will recognize many variations, modifications, and alternatives.

2. Workflows Supporting VVol-Based Replication and Recovery

The following subsections describe various workflows that can be executed in the context of system environment 200 of FIG. 2 for supporting virtual volume-based replication and recovery across sites 220 and 220' according to an embodiment. As part of these workflows, the virtualization platform-side components at sites 220/220' can invoke a set of novel APIs (denoted in italics) that have been added to the VVol framework in order to control/direct the replication and recovery processes.

The workflows described below assume that one or more replication groups have been preconfigured at SPs 212 and 212' by, e.g., a storage administrator. Each replication group defines zero or more virtual volumes that should be replicated together (i.e., in an atomic fashion) from source site 220 to target site 220'. These virtual volumes may be associated with a single VM or multiple VMs. In cases where a set of virtual volumes store data and/or metadata that adheres to transactional semantics (e.g., a transaction log in virtual volume V1 and transaction data in virtual volume V2), grouping the virtual volumes into the same replication group ensures that the data/metadata included in the volumes remain transactionally consistent after being replicated to the target site. Each replication group can also define parameters that are used to guide the replication of that group, such as a recovery point objective (RPO). In a particular embodiment, every virtual volume that is provisioned with replication enabled is configured to be part of a replication group (even if the virtual volume is the only member of the group).

The workflows below also assume that a replication relationship, or topology, has been preconfigured by the storage administrator between a "fault domain" at source site 220 and a corresponding fault domain at target site 220'. Each fault domain represents a logical set of replication groups that have been defined at the respective SP/site. In one embodiment, these fault domains can correspond to particular storage arrays and/or other storage devices that store the member virtual volumes of the fault domain's replication groups. The replication relationship/topology between the faults domains at sites 220 and 220' indicates that the storage providers handling the fault domains are "replication peers," and thus are configured to act as a source or target for virtual volume replication.

2.A Virtual Volume Provisioning

Figure 3:
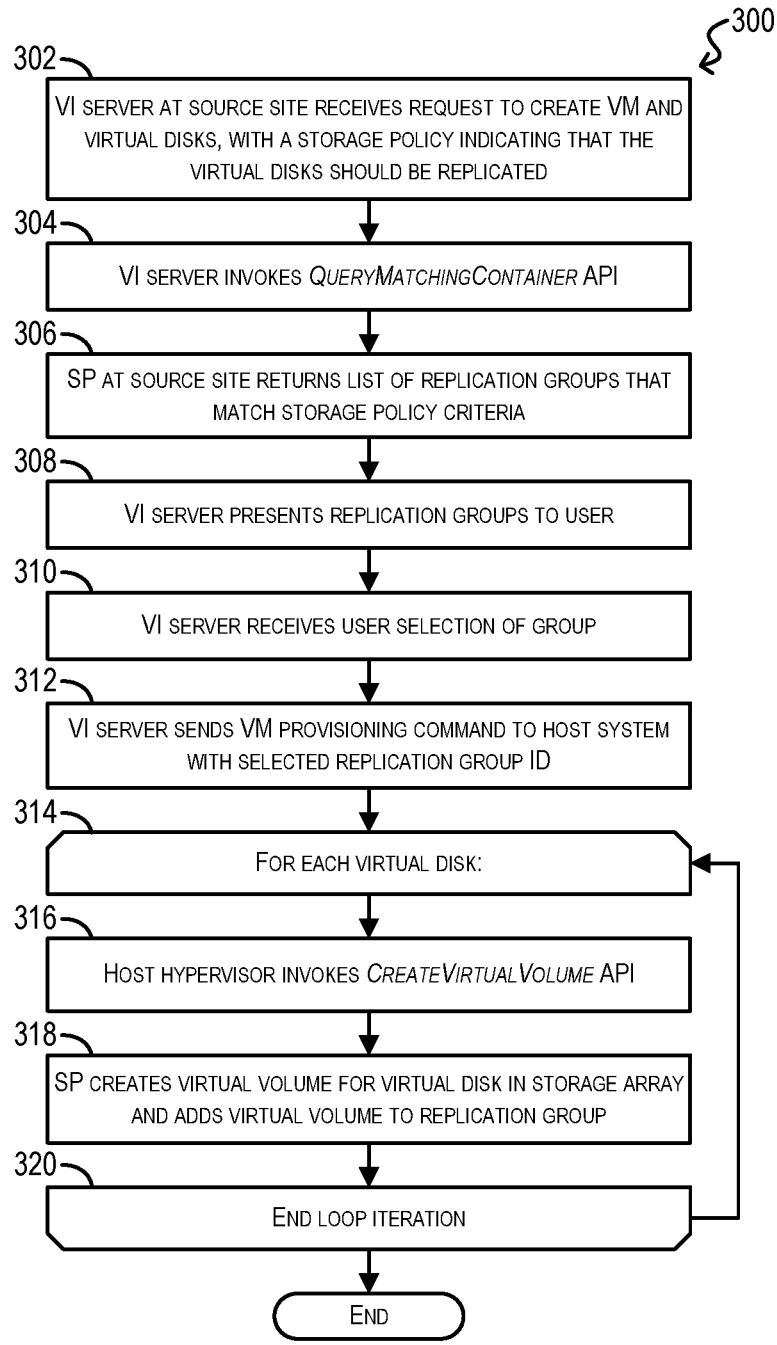
FIG. 3 depicts a virtual volume provisioning workflow according to an embodiment.

FIG. 3 depicts a workflow 300 that can be executed by the VVol components at source site 220 for provisioning one or more virtual volumes with replication enabled according to an embodiment. The phrase "replication enabled" means that the virtual volumes will be replicated in an autonomous fashion from one VVol-enabled storage array to another.

Starting with block 302, VI server 202 at source site 220 can receive, from a user via a VM provisioning user interface (UI), a request to create a VM (e.g., VM 208) and one or more constituent virtual disks, with a storage policy indicating that the virtual disks should be replicated. The storage policy can include, among other things, a desired replication target site (e.g., site 220') and a desired RPO for the replication process.

In response, SMS 214 of VI server 202 can invoke, via replication support module 224, a QueryMatchingContainer API that is exposed by SP 212 (block 304). This invocation can cause SP 212 to return a list of replication groups (and corresponding IDs) that have been configured on SP 212 and that match the criteria specified in the storage policy received at block 302 (block 306). For example, if the storage policy indicates that the desired target site is site 220' and the desired RPO is 5 minutes, the returned list can identify replication groups that have been configured on SP 212 to be replicated to site 220' and that specify an RPO of 5 minutes (or less).

At blocks 308 and 310, VI server 202 can present, via the VM provisioning user interface, the list of replication groups to the user and can receive a user selection of a particular group. Alternatively, the user can request that a new replication group be created for the current VM. VI server 202 can subsequently send a command to provision VM 208 and its virtual disk(s), along with an ID of the selected replication group, to an appropriate host system/hypervisor in source site 220 (e.g., host system 204/hypervisor 206) (block 312).

Upon receiving the VM provisioning command from VI server 202, SHM 216 of hypervisor 206 can enter a loop for each virtual disk of the VM (block 314). Within this loop, SHM 216 can invoke, via replication support module 226, a Create Virtual Volume API that is exposed by SP 212, and can pass the replication group ID as an input parameter (block 316). This invocation can cause SP 212 to create a virtual volume for the current virtual disk on storage array 210 and add the virtual volume to the specified replication group (block 318).

At block 320, SHM 216 can reach the end of the current loop iteration and return to block 314 in order to process any additional virtual disks of VM 208. Once all virtual disks have been processed, workflow 300 can end.

At the conclusion of workflow 300, all of the virtual disks of VM 208 will have corresponding virtual volumes provisioned in storage array 210 and each virtual volume will be part of the replication group selected at block 310. In various embodiments, this will cause replicator 222 of SP 212 to autonomously replicate, during runtime of VM 208, the contents of the VM's virtual volumes from storage array 210 at source site 220 to the storage array/target site identified in the replication group definition (e.g., storage array 210'/target site 220'), in accordance with the replication parameters specified in the group definition. Replicator 222 will perform this replication process in a manner that ensures that the order of writes to the virtual volumes in the group (i.e., write order fidelity) is maintained at the target site.

During the replication process, at each RPO time interval, a point-in-time replica will be created for each virtual volume in the replication group at the target storage array/site. These point-in-time replicas may not be accessible to the VI server or hosts at the target site until a test failover is initiated (discussed in subsection 2.C below).

2.B Replication Discovery and Recovery Plan Generation

Figure 4:
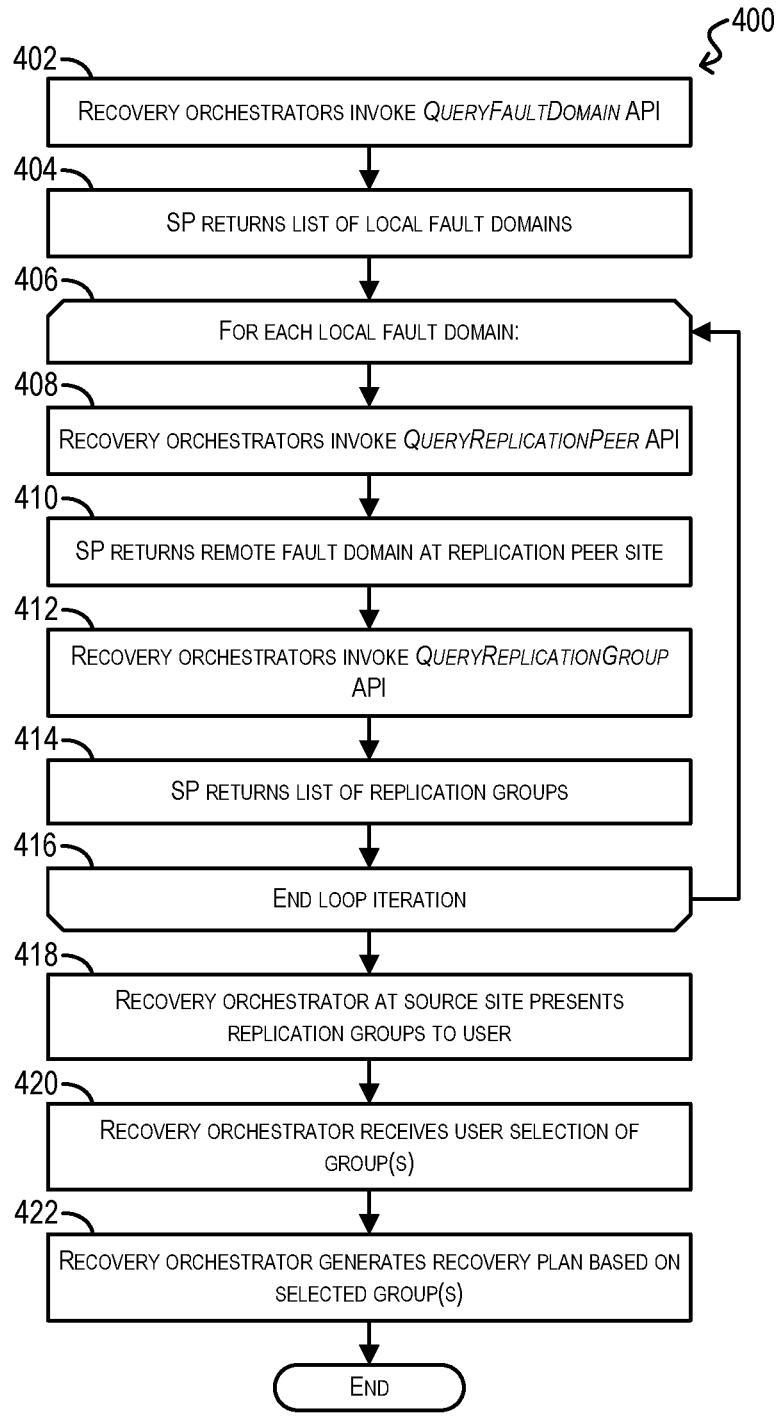
FIG. 4 depicts a replication discovery and recovery plan generation workflow according to an embodiment.

FIG. 4 depicts a workflow 400 that can be executed by recovery orchestrators 228/228' at sites 220/220' for discovering a replication topology between the sites and for generating a recovery plan for virtual volumes replicated to target site 220' according to an embodiment.

Starting with block 402, recovery orchestrators 228 and 228' can each invoke a QueryFaultDomain API that is exposed by SP 212/212'. This invocation can cause SP 212/212' to return to recovery orchestrators 228/228 a list of local fault domains configured at site 220/220' (block 404). As mentioned previously, each fault domain represents a logical grouping of replication groups and may correspond to, e.g., particular storage arrays and/or other storage devices at the site.

At blocks 406 and 408, recovery orchestrators 228/228' can enter a loop for each local fault domain and, within the loop, can invoke a QueryReplicationPeer API exposed by SP 212/212'. The orchestrators can pass the local fault domain's ID as an input parameter to this API. In response, SP 212/212' can return a remote fault domain at a replication peer site (e.g., 220 or 220') that is configured to act a replication source or target for the replication groups defined in the local fault domain (block 410). In this way, recovery orchestrators 228/228' can determine target-source replication relationships that have been configured between the local fault domain and other sites.

At block 412, recovery orchestrator 228 at source site 220 can invoke a QueryReplicationGroup API exposed by SP 212 based on the remote and local fault domains. This invocation can cause SP 212 to return a list of replication groups (and their constituent virtual volumes) that are part of the specified fault domains (block 414). Then, once all local fault domains have been processed (block 416), recovery orchestrator 228 can present, via a UI, the replication group information returned at block 414 to a user (block 418).

Finally, at blocks 420 and 422, recovery orchestrator 228 can receive, from the user via the UI, a selection of one or more of the replication groups presented at block 418 and can generate a recovery plan that includes the selected replication group(s). This recovery plan can be communicated to recovery orchestrator 228' at target site 220' and enacted by orchestrator 228' during a test failover process or an actual failover process in order to bring the replicas of the virtual volumes in the selected replication groups into an operational state at target site 220'.

2.C Test Failover

Figure 5:
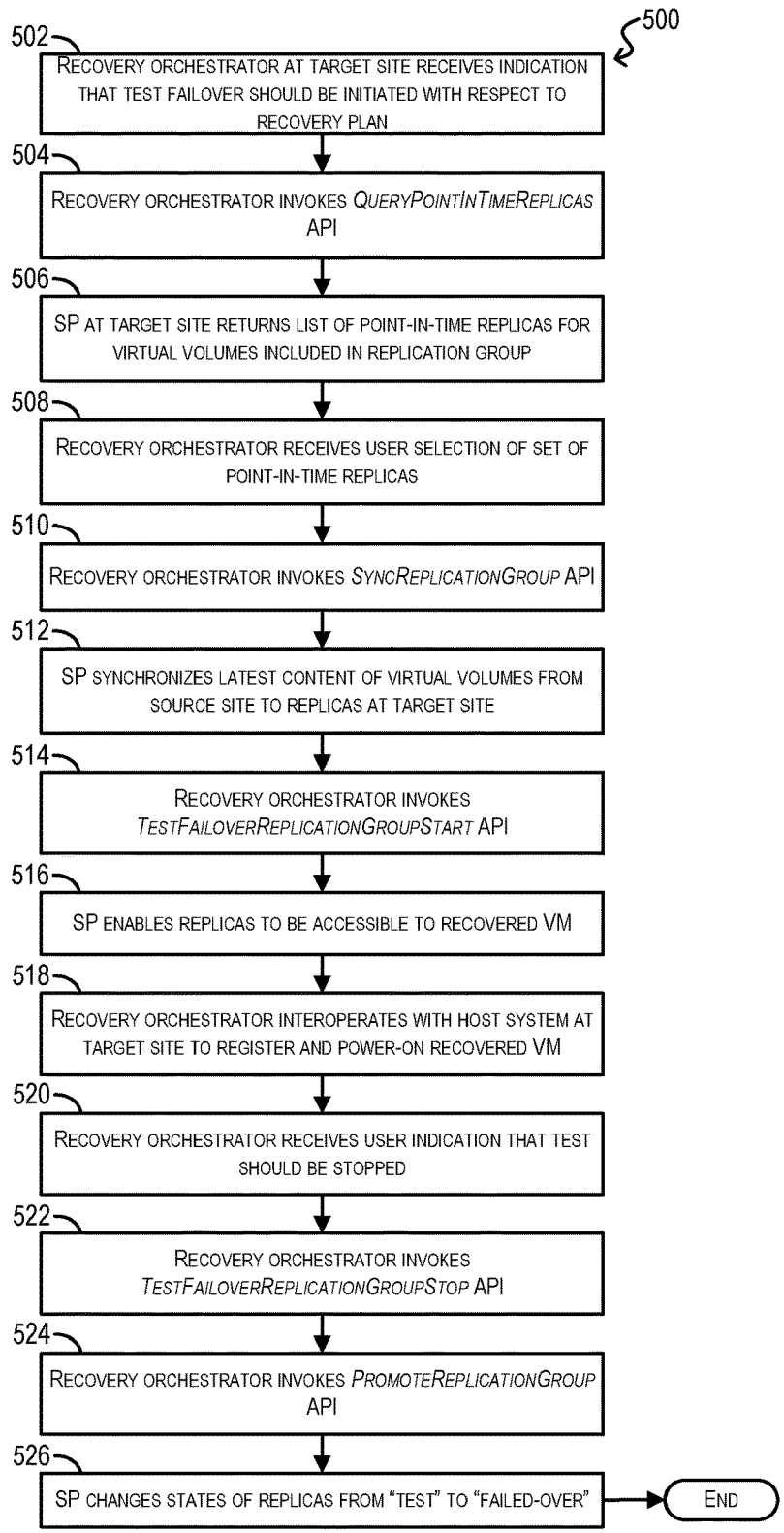
FIG. 5 depicts a test failover workflow according to an embodiment.

FIG. 5 depicts a workflow 500 that can be executed by recovery orchestrator 228' at target site 220' for implementing a test failover of a VM (e.g., 208 of FIG. 2) and its associated virtual volumes (e.g., 218(1)-(K) of FIG. 2) according to an embodiment. This test failover may be performed for various reasons, such as to validate the ability of VM 208 and its virtual volumes to be properly recovered at target site 220'. Workflow 500 assumes that virtual volumes 218(1)-(K) have been provisioned at source site 220 as a single replication group 230 with replication enabled per provisioning workflow 300 of FIG. 3, and that one or more point-in-time replicas of those virtual volumes have been created at target site 220'. Workflow 500 further assumes that a user has created a recovery plan comprising virtual volumes 218(1)-(K)/replication group 230 at target site 220' per recovery plan generation workflow 400 of FIG. 4.

At block 502, recovery orchestrator 228' can receive, from a user via a recovery UI, an indication that a test failover should be initiated with respect to the recovery plan comprising virtual volumes 218(1)-(K)/replication group 230. In response, recovery orchestrator 228' can invoke a QueryPointInTimeReplicas API that is exposed by SP 212' at target site 220' and can pass the ID of replication group 230 as an input parameter (block 504). This invocation can cause SP 212' to return a list of all point-in-time replicas of virtual volumes 218(1)-(K) that have been created in target-side storage array 210' (block 506).

At block 508, recovery orchestrator 228' can receive a user selection of a particular set of point-in-time replicas that will serve as the basis for the test failover. If the user wishes to recover to the latest point-in-time replica, recovery orchestrator 228' can invoke a SyncReplicationGroup API exposed by SP 212' in order to synchronize the latest data for replication group 230 from source-side storage array 210 to target-side storage array 210' (blocks 510 and 512). It should be noted that, in some cases, source site 220 may not be accessible during the test failover process. In these cases, this synchronization step can be omitted.

At block 514, recovery orchestrator 228' can begin the test failover of VM 208 and, as part of this process, can invoke a TestFailoverReplicationGroupStart API exposed by SP 212'. Orchestrator 228' can pass the ID of replication group 230 as an input parameter to the API. This invocation can cause SP 212' to perform (via, e.g., replicator module 222') various steps that enable the selected virtual volume replicas to be accessible to the recovered version of VM 208 for testing purposes (block 516). For example, in one embodiment, this invocation can cause SP 212' to create, in storage array 210', a test failover image for each virtual volume replica in replication group 230, and to patch the configuration files (e.g., .vmx and .vmdk files) of the recovered VM to point to the test failover images. Upon completion, SP 212' can return to recovery orchestrator 228' an ID of the recovered VM (or a path to its .vmx file) and a storage path for each test failover image.

Then at block 518, recovery orchestrator 228' can interoperate with the hypervisor hosting the recovered VM (e.g., hypervisor 206') to register and power-on the recovered VM at target site 220', and the user can monitor the recovered VM for any problems/errors.

After the user has verified that the test failover was successful or unsuccessful, recovery orchestrator 228' can receive from the user an indication that the test should be stopped (block 520). In response, recovery orchestrator 228' can interoperate with host hypervisor 206' to power-off and unregister the recovered VM (not shown) and recovery orchestrator 228' can invoke a TestFailoverReplicationGroupStop API exposed by SP 212' (block 522). This invocation can cause SP 212' undo one or more steps executed by SP 212' in response to the TestFailoverReplicationGroupStart API invocation.

Finally, if the test failover was successful, the user can optionally promote the virtual volume replicas at target site 220' to a production status (indicating that the replicas are ready for an actual failover of VM 208). This can cause recovery orchestrator 228' to invoke a PromoteReplicationGroup API exposed by SP 212', which in turn can cause SP 212' to change a state associated with the virtual volume replicas from "in-test" to "failed-over" (or some other equivalent state indicating that the replicas are ready for an actual failover) (blocks 524 and 526).

2. Actual Failover

Figure 6:
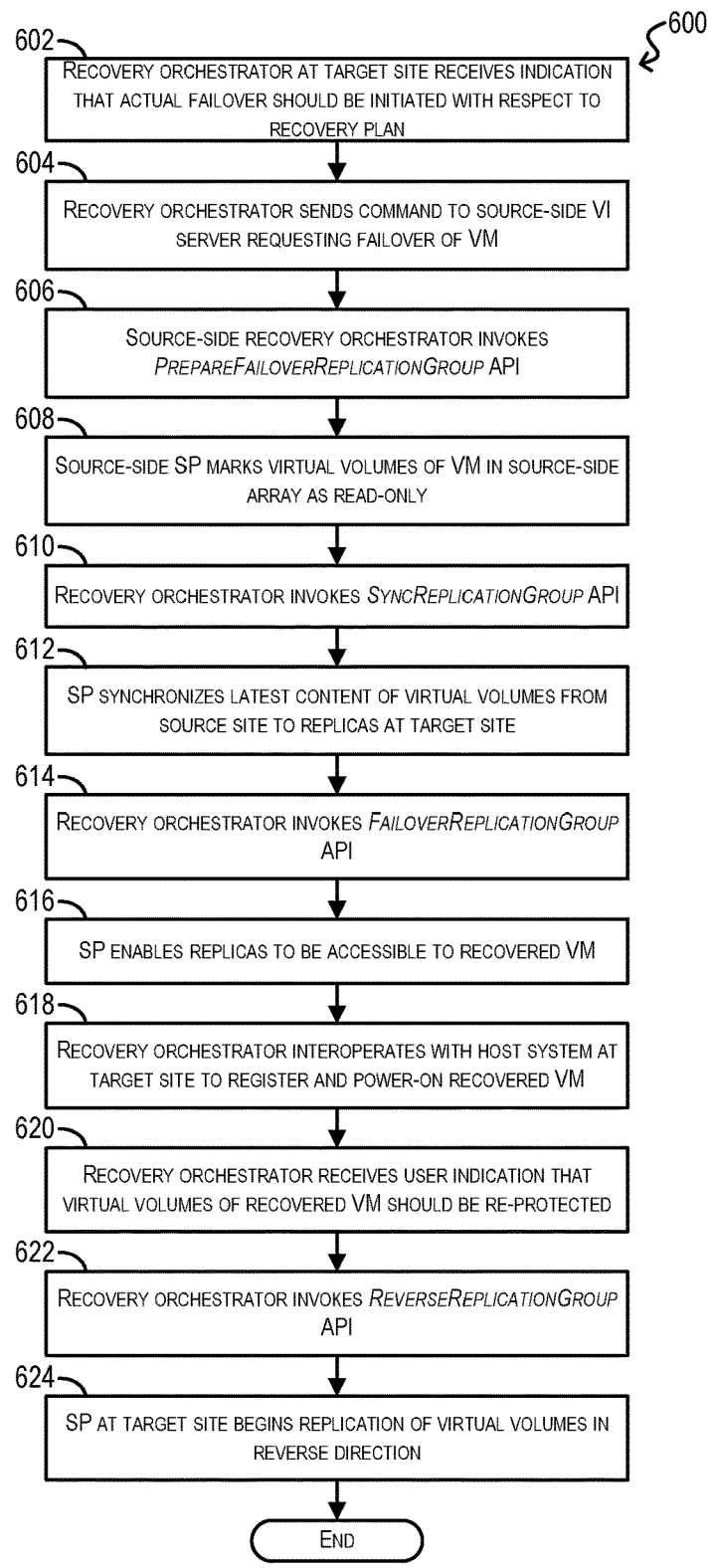
FIG. 6 depicts an actual failover workflow according to an embodiment.

FIG. 6 depicts a workflow 600 that can be executed by recovery orchestrator 228' at target site 220' for implementing an actual failover of a VM (e.g., 208 of FIG. 2) and its associated virtual volumes (e.g., 218(1)-(K) of FIG. 2) according to an embodiment. This actual failover may be a planned failover or forced failover (i.e., caused by an unexpected failure at the source site). Like workflow 500 of FIG. 5, workflow 600 assumes that virtual volumes 218(1)-(K) have been provisioned at source site 220 as a single replication group 230 with replication enabled per provisioning workflow 300 of FIG. 3, and that one or more point-in-time replicas of those virtual volumes have been created at target site 220'. Workflow 600 further assumes that a user has created a recovery plan comprising virtual volumes 218(1)-(K)/replication group 230 at target site 220' per recovery plan generation workflow 400 of FIG. 4.

At block 602, recovery orchestrator 228' can receive, from a user via a recovery UI, an indication that an actual failover should be initiated with respect to the recovery plan comprising virtual volumes 218(1)-(K)/replication group 230. In response, recovery orchestrator 228' can send a command to source-side VI server 202 requesting failover of VM 208 (block 604).

Upon receiving this command, VI server 202 can power-off and unregister VM 208 at source-side host system 204. In addition, recovery orchestrator 228 can invoke a PrepareFailoverReplicationGroup API exposed by SP 212 and can pass the ID of replication group 230 as an input parameter (block 606). This invocation can cause SP 212 to mark the source virtual volumes of the replication group stored in source-side storage array 210 as read-only, so that they are not modified further prior to the execution of the failover (block 608).

Subsequently to (or concurrently with) blocks 604-608, recovery orchestrator 228' can invoke the SyncReplicationGroup API at target site 220' (block 610). This API can cause SP 212' to synchronize the contents of the latest virtual machine replicas in target-side storage array 210' with the original virtual volumes at source site 220 (block 612).

Then, at block 614, recovery orchestrator 228' can begin the actual failover of VM 208 at target site 220' and, as part of this process, can invoke a FailoverReplicationGroup API exposed by SP 212'. Orchestrator 228' can pass the ID of replication group 230 as an input parameter to this API. The invocation can cause SP 212' to perform, via replicator module 222', various steps that are similar to the TestFailoverReplicationGroupStart API discussed previously and that enable the latest virtual volume replicas on storage array 210' to be accessible to the recovered version of VM 208 (block 616). For example, in one embodiment, this invocation can cause SP 212' to create, in storage array 210', a failover image for each virtual volume replica in replication group 230 and to patch the configuration files (e.g., .vmx and .vmdk files) of the recovered VM to point to the failover images. Upon completion, SP 212' can return to recovery orchestrator 228' an ID of the recovered VM (or a path to its .vmx file) and a storage path for each failover image.

At block 618, recovery orchestrator 228' can interoperate with the hypervisor hosting the recovered VM (e.g., hypervisor 206') to register and power-on the recovered VM at target site 220'.

Finally, at block 620-624, recovery orchestrator 228' may receive an indication from the user that he/she wishes to initiate replication of replication group 230 in the opposite direction (i.e., from target site 220' to source site 220) in order to "re-protect" the virtual volumes of the recovered VM. In these cases, recovery orchestrator 228' can invoke a ReverseReplicateGroup API that is exposed by SP 212'. This invocation can cause replicator module 222' of SP 212' to begin replication of the failed-over virtual volumes to SP 212/storage array 210 at source site 220. In certain embodiments, this reverse replication process may cause the ID of the replication group to change, although the IDs of the virtual volume members will remain the same.

Certain embodiments described herein involve a hardware abstraction layer on top of a host system (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, VMs are used as an example for the containers and hypervisors as an example for the hardware abstraction layer. Each VM generally includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for supporting replication and recovery of virtual volumes, the method comprising:

receiving, by a virtual infrastructure (VI) server at a first site, a request to create a virtual machine (VM) and a virtual disk of the VM, the request including storage policy information defining one or more criteria for replicating the virtual disk to a second site;

invoking, by the VI server, a first application programming interface (API) exposed by a first storage provider associated with a first storage array at the first site, the invoking of the first API causing the first storage provider to return to the VI server a list of replication groups configured on the first storage provider, each replication group in the list of replication groups comprising zero or more virtual volumes stored on the first storage array, each virtual volume representing a logical storage object that is configured to hold persistent data for a specific VM;

receiving, by the VI server, a selection of a replication group in the list of replication groups; and communicating, by the VI server, the replication group to a host system at the first site, wherein the host system is configured to invoke a second API exposed by the first storage provider that causes the first storage provider to provision, on the first storage array, a virtual volume for the virtual disk and to add the virtual volume as a member of the replication group.

2. The method of claim 1 wherein the list of replication groups returned by the first storage provider comprise replication groups that satisfy the one or more criteria.

3. The method of claim 1 wherein the first storage provider is configured to replicate the virtual volumes of the replication group in an atomic fashion to a second storage array associated with a second storage provider at the second site.

4. The method of claim 3 further comprising invoking, by a recovery orchestrator at the second site, one or more third APIs exposed by the second storage provider, the one or more third APIs enabling the recovery orchestrator to discover a replication relationship between the first and second sites and to generate a recovery plan for recovering the VM and the virtual volume for the VM's virtual disk at the second site.

5. The method of claim 3 further comprising executing, by a recovery orchestrator at the second site, a test failover of the VM and the virtual volume for the VM's virtual disk at the second site, the executing of the test failover including:
invoking, by the recovery orchestrator, a third API exposed by the second storage provider that causes the second storage provider to identify one or more point-in-time replicas of the virtual volume at the second site;
receiving, by the recovery orchestrator, a selection of a point-in-time replica from the one or more point-in-time replicas; and
invoking, by the recovery orchestrator, a fourth API exposed by the second storage provider to initiate execution of the test failover, the fourth API causing the second storage provider to create a test image from the selected point-in-time replica and to modify one or more configuration files of the VM to point to the test image.

6. The method of claim 5 wherein executing the test failover further comprises, if the test failover is successful, invoking by the recovery orchestrator a fifth API exposed by the second storage provider to promote the point-in-time replica to a status indicating that the point-in-time replica may be used for an actual failover.

7. The method of claim 3 further comprising executing, by a recovery orchestrator at the second site, an actual failover of the VM and the virtual volume for the VM's virtual disk at the second site, the executing of the actual failover including:
invoking, by the VI server at the first site, a third API exposed by the first storage provider that causes the virtual volume stored in the first storage array to be marked as read-only;
invoking, by the recovery orchestrator, a fourth API exposed by the second storage provider that causes contents of the virtual volume stored in the first storage array to be synchronized to a replica stored in the second storage array at the second site;
invoking, by the recovery orchestrator, a fifth API exposed by the second storage provider to initiate execution of the actual failover; and
upon completion of the actual failover, invoking, by the recovery orchestrator, a sixth API exposed by the second storage provider for initiating a reverse replication of the virtual volume from the second site to the first site.

8. A non-transitory computer readable storage medium having stored thereon program code executable by a virtual infrastructure (VI) server at a first site, the program code embodying a method for supporting replication and recovery of virtual volumes, the method comprising:
receiving a request to create a virtual machine (VM) and a virtual disk of the VM, the request including storage policy information defining one or more criteria for replicating the virtual disk to a second site;
invoking a first application programming interface (API) exposed by a first storage provider associated with a first storage array at the first site, the invoking of the first API causing the first storage provider to return to the VI server a list of replication groups configured on the first storage provider, each replication group in the list of replication groups comprising zero or more virtual volumes stored on the first storage array, each virtual volume representing a logical storage object that is configured to hold persistent data for a specific VM;
receiving a selection of a replication group in the list of replication groups; and
communicating the replication group to a host system at the first site, wherein the host system is configured to invoke a second API exposed by the first storage provider that causes the first storage provider to provision, on the first storage array, a virtual volume for the virtual disk and to add the virtual volume as a member of the replication group.

9. The non-transitory computer readable storage medium of claim 8 wherein the list of replication groups returned by the first storage provider comprise replication groups that satisfy the one or more criteria.

10. The non-transitory computer readable storage medium of claim 8 wherein the first storage provider is configured to replicate the virtual volumes of the replication group in an atomic fashion to a second storage array associated with a second storage provider at the second site.

11. The non-transitory computer readable storage medium of claim 10 wherein the method further comprises invoking, by a recovery orchestrator at the second site, one or more third APIs exposed by the second storage provider, the one or more third APIs enabling the recovery orchestrator to discover a replication relationship between the first and second sites and to generate a recovery plan for recovering the VM and the virtual volume for the VM's virtual disk at the second site.

12. The non-transitory computer readable storage medium of claim 10 wherein the method further comprises executing, by a recovery orchestrator at the second site, a test failover of the VM and the virtual volume for the VM's virtual disk at the second site, the executing of the test failover including:
invoking, by the recovery orchestrator, a third API exposed by the second storage provider that causes the second storage provider to identify one or more point-in-time replicas of the virtual volume at the second site;
receiving, by the recovery orchestrator, a selection of a point-in-time replica from the one or more point-in-time replicas; and
invoking, by the recovery orchestrator, a fourth API exposed by the second storage provider to initiate execution of the test failover, the fourth API causing the second storage provider to create a test image from the selected point-in-time replica and to modify one or more configuration files of the VM to point to the test image.

13. The non-transitory computer readable storage medium of claim 12 wherein executing the test failover further comprises, if the test failover is successful, invoking by the recovery orchestrator a fifth API exposed by the second storage provider to promote the point-in-time replica to a status indicating that the point-in-time replica may be used for an actual failover.

14. The non-transitory computer readable storage medium of claim 10 wherein the method further comprises executing, by a recovery orchestrator at the second site, an actual failover of the VM and the virtual volume for the VM's virtual disk at the second site, the executing of the actual failover including:
 invoking, by the VI server at the first site, a third API exposed by the first storage provider that causes the virtual volume stored in the first storage array to be marked as read-only;
 invoking, by the recovery orchestrator, a fourth API exposed by the second storage provider that causes contents of the virtual volume stored in the first storage array to be synchronized to a replica stored in the second storage array at the second site;
 invoking, by the recovery orchestrator, a fifth API exposed by the second storage provider to initiate execution of the actual failover; and
 upon completion of the actual failover, invoking, by the recovery orchestrator, a sixth API exposed by the second storage provider for initiating a reverse replication of the virtual volume from the second site to the first site.

15. A computer system acting as a virtual infrastructure (VI) server at a first site, the computer system comprising:
 a processor; and
 a non-transitory computer readable storage medium having stored thereon program code that, when executed by the processor, causes the processor to:
  receive a request to create a virtual machine (VM) and a virtual disk of the VM, the request including storage policy information defining one or more criteria for replicating the virtual disk to a second site;
  invoke a first application programming interface (API) exposed by a first storage provider associated with a first storage array at the first site, the invoking of the first API causing the first storage provider to return to the VI server a list of replication groups configured on the first storage provider, each replication group in the list of replication groups comprising zero or more virtual volumes stored on the first storage array, each virtual volume representing a logical storage object that is configured to hold persistent data for a specific VM;
  receive a selection of a replication group in the list of replication groups; and
  communicate the replication group to a host system at the first site, wherein the host system is configured to invoke a second API exposed by the first storage provider that causes the first storage provider to provision, on the first storage array, a virtual volume for the virtual disk and to add the virtual volume as a member of the replication group.

16. The computer system of claim 15 wherein the list of replication groups returned by the first storage provider comprise replication groups that satisfy the one or more criteria.

17. The computer system of claim 15 wherein the first storage provider is configured to replicate the virtual volumes of the replication group in an atomic fashion to a second storage array associated with a second storage provider at the second site.

18. The computer system of claim 17 wherein a recovery orchestrator at the second site is configured to invoke one or more third APIs exposed by the second storage provider, the one or more third APIs enabling the recovery orchestrator to discover a replication relationship between the first and second sites and to generate a recovery plan for recovering the VM and the virtual volume for the VM's virtual disk at the second site.

19. The computer system of claim 17 wherein a recovery orchestrator at the second site is configured to execute a test failover of the VM and the virtual volume for the VM's virtual disk at the second site, the executing of the test failover including:
 invoking a third API exposed by the second storage provider that causes the second storage provider to identify one or more point-in-time replicas of the virtual volume at the second site;
 receiving a selection of a point-in-time replica from the one or more point-in-time replicas; and
 invoking a fourth API exposed by the second storage provider to initiate execution of the test failover, the fourth API causing the second storage provider to create a test image from the selected point-in-time replica and to modify one or more configuration files of the VM to point to the test image.

20. The computer system of claim 19 wherein executing the test failover further comprises, if the test failover is successful, invoking a fifth API exposed by the second storage provider to promote the point-in-time replica to a status indicating that the point-in-time replica may be used for an actual failover.

21. The computer system of claim 17 wherein a recovery orchestrator at the second site is configured to execute an actual failover of the VM and the virtual volume for the VM's virtual disk at the second site, the executing of the actual failover including:
 invoking, by the VI server at the first site, a third API exposed by the first storage provider that causes the virtual volume stored in the first storage array to be marked as read-only;
 invoking, by the recovery orchestrator, a fourth API exposed by the second storage provider that causes contents of the virtual volume stored in the first storage array to be synchronized to a replica stored in the second storage array at the second site;
 invoking, by the recovery orchestrator, a fifth API exposed by the second storage provider to initiate execution of the actual failover; and
 upon completion of the actual failover, invoking, by the recovery orchestrator, a sixth API exposed by the second storage provider for initiating a reverse replication of the virtual volume from the second site to the first site.

* * * * *